(12) United States Patent
Webb

(10) Patent No.: US 8,597,387 B2
(45) Date of Patent: Dec. 3, 2013

(54) ABRASIVE COMPACT WITH IMPROVED MACHINABILITY

(71) Applicant: Diamond Innovations, Inc., Worthington, OH (US)

(72) Inventor: Steven W. Webb, Woodlands, TX (US)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 13/748,934

(22) Filed: Jan. 24, 2013

(65) Prior Publication Data

US 2013/0133269 A1    May 30, 2013

Related U.S. Application Data

(62) Division of application No. 12/518,745, filed on Jun. 11, 2009, now Pat. No. 8,404,010.

(51) Int. Cl.
  *B24D 3/04* (2006.01)
  *B24D 3/14* (2006.01)
  *B24D 3/34* (2006.01)

(52) U.S. Cl.
  USPC .................................. 51/307; 51/309; 51/293

(58) Field of Classification Search
  USPC .................................................. 175/327–435
  See application file for complete search history.

(56) References Cited

U.S. PATENT DOCUMENTS

| | | | |
|---|---|---|---|
| 3,609,818 A * | 10/1971 | Wentorf, Jr. | 425/77 |
| 3,918,219 A | 11/1975 | Wentorf, Jr. et al. | |
| 5,211,726 A | 5/1993 | Slutz et al. | |
| 5,271,749 A | 12/1993 | Rai et al. | |
| 5,697,994 A | 12/1997 | Packer et al. | |
| 5,830,813 A | 11/1998 | Yao et al. | |
| 6,203,897 B1 | 3/2001 | Koizumi et al. | |
| 6,759,128 B1 | 7/2004 | Zhao et al. | |
| 6,919,040 B2 | 7/2005 | Fries et al. | |

FOREIGN PATENT DOCUMENTS

| | | | |
|---|---|---|---|
| GB | 1296589 | | 11/1972 |
| IE | 940108 | * | 9/1995 |
| IE | 940108 A2 | | 9/1995 |
| JP | 08 109432 | | 4/1996 |
| JP | 09 184030 | | 7/1997 |
| WO | 0212578 A3 | | 2/2002 |
| WO | 0229127 A3 | | 2/2002 |

* cited by examiner

*Primary Examiner* — Kaj K Olsen
*Assistant Examiner* — Jared Wood
(74) *Attorney, Agent, or Firm* — Frank Y. Gao, Esq

(57) ABSTRACT

An abrasive compact may include an ultra-hard phase that may include ultra-hard particles having a Knoop hardness of 5000 KHN or greater, a sinter catalyst, and a reaction phase that may include a catalyst-ceramic compound having a Knoop hardness lower than that of the ultra-hard phase.

17 Claims, 1 Drawing Sheet

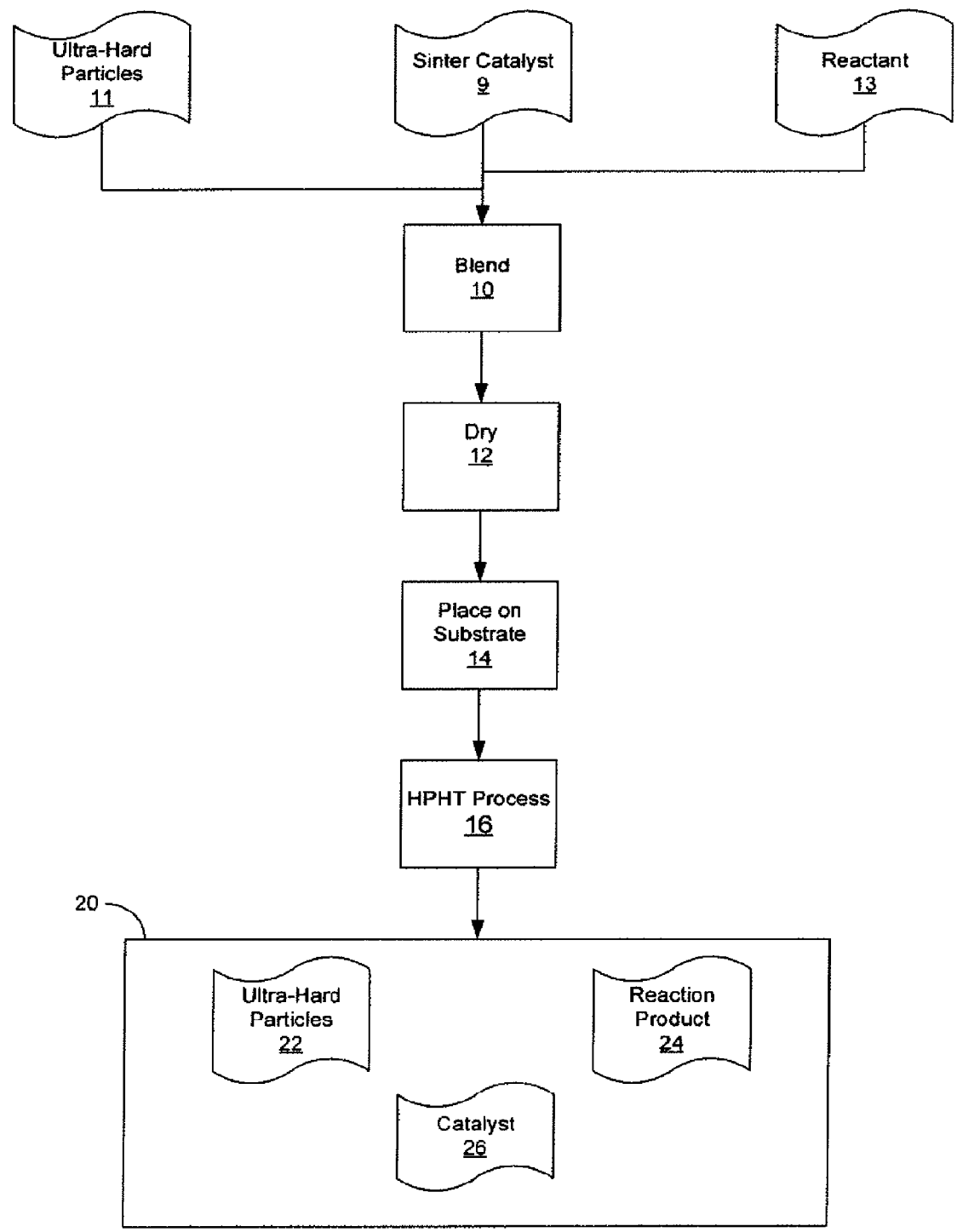

US 8,597,387 B2

ABRASIVE COMPACT WITH IMPROVED MACHINABILITY

CROSS-REFERENCE TO RELATED APPLICATIONS

This patent application is a divisional patent application Ser. No. 12/518,745, filed Jun. 11, 2009, which was national stage entry for PCT/US07/87442, filed Dec. 13, 2007, now abandoned, which claims priority to U.S. provisional patent application No. 60/869,804, filed Dec. 13, 2006.

STATEMENT REGARDING FEDERALLY SPONSORED RESEARCH

Not applicable.

NAMES OF PARTIES TO A JOINT RESEARCH AGREEMENT

Not applicable.

SEQUENCE LISTING

Not applicable.

BACKGROUND

1. Technical Field

The disclosure generally relates to abrasive compacts that are more easily formed for example, into useful geometries.

2. Description of the Related Art

Abrasive compacts are used in drilling, boring, cutting, milling, grinding and other material removal operations. Abrasive compacts consist of ultra-hard particles sintered, bonded, or otherwise consolidated into a solid body. Ultra-hard particles may be diamond, cubic boron nitride, carbon-nitride (CN) compounds, boron-carbon-nitrogen-oxygen (BCNO) compounds or any material with hardness greater than boron carbide. The ultra-hard particles may be for example single crystals or a polycrystalline aggregates.

In commerce, abrasive compacts may be known as diamond or polycrystalline diamond (PCD) compacts when based on diamond, or polycrystalline cubic boron nitride (PCBN) compacts when based on cubic boron nitride (cBN). Abrasive compacts from which residual sintering catalysts have been removed may be called leached or thermally stable compacts. Abrasive compacts integrated with cemented carbide substrates are referred to as supported compacts. Supported abrasive compacts include a cemented carbide substrate to increase impact resistance, strength, as well as simplify the attachment of abrasive compacts to engineering structures.

Abrasive compacts are manufactured in large disks referred to as "blanks" or "tool blanks" from which individual cutting tips are cut using many different methods.

Abrasive compacts essentially based on a single ultra-hard phase, for example diamond or cubic boron nitride are well known. These abrasive compacts however are extremely hard and therefore difficult to grind or otherwise fabricate into useful components of controlled dimension with smooth or defect-free surfaces. The expense of abrasive machining, laser cutting, or plasma machining is substantial and limits the commercial application of abrasive compacts. One solution has been to produce abrasive compacts with ultra-hard particles and less hard phases. However, these compacts have not provided better commercial properties, and are typically defective as the presence of the less hard phases disrupts the function of the sinter catalyst.

Defects in abrasive compacts refer to cracks, chips, pits, delaminations internal or surface, spots and abrasive layer or overall tool blank shape distortion, of varying scale and degree. Defects are undesirable as they will impair tool strength and tool life or yield of useful tools from a blank.

U.S. Pat. No. 4,016,736 describes a diamond and cubic boron nitride compact wherein the thermal resistance of cubic boron nitride is exploited. U.S. Pat. No. 4,797,241 describes an abrasive compact comprising a mixture of PCD and PCBN, each independently sintered. U.S. Pat. No. 6,759,128 describes a sintered mixture of B—C—N new solid phase. U.S. Pat. Nos. 6,772,849, 4,734,339, 5,755,299 all describe boride-coated PCD for drill bits. U.S. Pat. No. 5,697,994 describes compacts comprising diamond and cubic boron nitride for enhanced corrosion resistance. However, none of these references describe hardness control or improved fabrication of compacts.

U.S. Patent Publication No. 2003/0019106 and U.S. Pat. No. 6,596,225 describe the use of hexagonal boron nitride as an unreactive mold coating. The boron nitride is not part of the abrasive compact.

High-pressure sintering of abrasive compacts with a catalytic liquid phase, typically molten Fe, Ni, Al, Co, Mn, W, alloys or blends thereof is also well known. Typically, catalyst is provided by blending metal particles with the ultra-hard particles or by contact with an external metal-containing source. The catalyst metal is melted and infiltrated into the compacted ultra-hard abrasive powders. Conformal contact of molten metal at ultra-hard particle contact points allows intergranular bonding to occur. When the molten metal contact is of sufficient duration and spatially uniform, the ultra-hard particles are dissolved and may be reprecipitated or recrystallized to provide a continuous matrix of high quality bonds between ultra-hard particles. The high quality bonds formed during compact sintering produce a compact with high hardness, approaching the value of the single-crystal ultra-hard phase. In addition to high hardness, the strong bonds formed between ultra-hard particles combined with a low level of microstructural defects impart high strength, high abrasion resistance, high heat tolerance and useful fracture toughness to the compact. This combination of properties has, heretofore, also dictated that the compact is extremely difficult to grind or otherwise form into useful shapes. Abrasive machining, laser cutting, and high energy plasma machining has been required as subsequent processing steps to produce a commercially useful tool blank.

It is also known that incomplete and/or non-uniform contact with, or unstable reactions of, the catalytic molten metal with the ultrahard grits produces a compact with lower quality interparticle bonds and increased defects. This defective compact may be less difficult to machine, but it will not provide the abrasive performance required for utility. It may simply crack or delaminate upon use. Thus an abrasive compact with coincident controlled hardness, useful toughness, strength and improved ease of fabrication is not known.

Accordingly, there is a need for a product or compact in which machinability is independently increased while maintaining high levels of hardness, strength and toughness by a process that is cost efficient.

The disclosure contained herein describes attempts to address one or more of the problems described above.

SUMMARY

An abrasive compact may include an ultra-hard phase that may include ultra-hard particles having a Knoop hardness of 5000 KHN or greater, a sinter catalyst, and a reaction phase that may include a catalyst-ceramic compound having a Knoop hardness lower than that of the ultra-hard phase.

In an embodiment, the reaction phase may include particles that are bonded to the ultra-hard phase particles. In another embodiment, the reaction phase may have a Knoop hardness of 3000 KHN or less.

In an embodiment, the ultra-hard particles may include diamond; the sinter catalyst may include one or more of Fe, Co, Al, Mn, W or Ni; and the reaction phase includes a compound of the catalyst and a reactant such as hexagonal boron nitride, graphite, any metallic or intermetallic sulphide or phosphide. In yet another embodiment, the ultra-hard particles may include cubic boron nitride; the sinter catalyst may include one or more of Fe, Co, Al, Mn, W or Ni; and the reaction phase may include carbon or boron or nitrogen.

An embodiment may include a reaction phase that may make up about 0.5 to about 20 weight-percent of the compact. In some embodiments, the average particle size of the reactant phase may be about 0.5 to about 25 microns. In some embodiments the average particle size of the ultra-hard particles may be about 0.5 to about 100 microns. Preferably, the average particle size of the reactant phase is less than the average particle size of the ultra-hard particles. The particle size of the reaction phase may vary, depending on the details of the reaction.

An embodiment may include a method of producing an abrasive compact. In an embodiment a method may include blending ultra-hard particles having a Knoop hardness of 5000 KHN or greater, a sinter catalyst, and reactant particles having a Knoop hardness lower than that of the ultra-hard particles to form a mixture. An embodiment may include sintering the mixture so that the reactant particles react with the sinter catalyst to form a reaction phase of a carbon-containing compound or a boron-containing compound (such as $Co_6W_6B_6$ or $W_2Co_{21}B_6$) within the sintered compact.

In an embodiment of a method, the reactant particles may include one or more of hexagonal boron nitride, graphite, molybdenum sulfide, tungsten sulfide, or a phosphide. In one embodiment, sintering may include applying to the mixture a temperature from about 1000° C. to about 2200° C., and a pressure of about 40 kbar to about 200 kbar, for a sintering time of about 5 minutes to about 300 minutes. In still another embodiment, a method may further include pre-coating the reactant particles with the sinter catalyst prior to blending. Another method embodiment may further include shaping the sintered compact.

An embodiment of an abrasive compact may include an ultra-hard phase, where the ultra-hard phase may include ultra-hard particles having a Knoop hardness of 5000 KHN or greater; a sinter catalyst; and a reaction product of the sinter catalyst and one or more of hexagonal boron nitride, graphite, a metallic sulphide, an intermetallic sulfide, a metal phosphide, or an intermetallic phosphide. Another embodiment may further include an unreacted phase of one or more of hexagonal boron nitride, graphite, a metallic sulphide, an intermetallic sulfide, a metal phosphide, or an intermetallic phosphide. An embodiment of an abrasive compact may include a reaction product that has a Knoop hardness of 3000 KHN or less.

In an embodiment, the ultra-hard particles may include one or more of diamond or cubic boron nitride; and the sinter catalyst may include one or more of Fe, Co, Al, W, and Ni or a compound containing one or more of those elements. In another embodiment, the reaction product may have a Knoop hardness lower than that of the ultra-hard phase.

BRIEF DESCRIPTION OF THE DRAWINGS

For a fuller understanding of the nature and advantages of the present invention, reference should be had to the following detailed description taken in connection with the accompanying drawings, in which:

FIG. 1 illustrates exemplary steps that may be taken in a method of forming an abrasive compact.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art. All publications mentioned herein are incorporated by reference in their entirety. Nothing herein is to be construed as an admission that the invention is not entitled to antedate such disclosure by virtue of prior invention.

As used herein, the term "about" means plus or minus 10% of the numerical value of the number with which it is being used. Therefore, about 50% means in the range of 40%-60%.

The compositions presented herein are expressed in the "addition percent" method.

The disclosure generally relates to abrasive compacts that are more easily machinable and methods of manufacturing such. In particular, the abrasive compacts of the disclosure include an ultra-hard phase, a sinter catalyst phase and a reaction phase. The reaction phase as described herein in further detail is formed by reacting reactant particles with the sinter catalyst.

The inventors have found that manipulation of a sinter catalyst and selection of the type and quantity of phases present in the material provide a compact with improved machinability. In particular, the inventors have found that the selection and addition of a catalyst and reactant particles (or as described below component "A") to the ultra-hard particles during the sintering process may form a reaction phase of a reaction product having a lower hardness than the ultra-hard particles. Such a material provides abrasive compacts with useful hardness, toughness, strength and reduced difficulty of machining without incurring new additional defects.

The abrasive compact of the disclosure contains a reaction product formed between the catalyst phase and the added ceramic or other reactant component. This reaction product is a new non ultra-hard "reaction phase" (referred to herein as component B), that is softer than the ultra-hard particles of the formed abrasive compact. The presence of the reactant or the reaction phase, at any level of conversion, will not negatively affect the function of the catalyst to sinter the ultra hard grits. The remainder of this disclosure will refer to the non-reacted reactant particles or additional component as "A" and the non ultra-hard phase, which is a compound of the sinter catalyst and the reactant, as the reaction phase, reaction product or "B".

Ultra-hard particles are those commonly used in the art and include for example, diamond, cubic boron nitride and the like. The hardness of these particles is commonly a Knoop hardness number of 5,000 KHN or greater. The size of the ultra-hard particles may be of any range known in the art that can be sintered to form hard, substantially defect-free articles, such as, for example, between 0.1 μm and 100 μm, or up to about 1000 μm particle diameter. In an embodiment, the size of the ultra-hard particles may be about 2 μm to about 8 μm. In another embodiment, the size of the ultra-hard particles may be about 2 μm to about 4 μm. In still another embodiment, the size of the ultra-hard particles may be about 5 μm to about 8 μm.

The sinter catalysts used in the abrasive compacts here may include those now or hereafter known in the art and include, for example Fe, Ni, Al, W, Mn or Co, or alloys, compounds, and combinations thereof. In some embodiments, the sinter catalyst may comprise cobalt, a cobalt/tungsten alloy, a cobalt/tungsten/carbon compound and/or a combination of carbon and Fe, Ni, Al, W, Mn, or Co.

In embodiments, component "A" or reactant particles may include, without limitation, hexagonal boron nitride (HBN), graphite, any metallic or intermetallic sulphide or phosphide or similar phases that react to some extent with sinter catalyst at ordinary high pressure, high temperature (HPHT) processing conditions to form a reactant-catalyst component. Component "A" particles are selectively chosen so that they react and/or transform with the sinter catalyst to form new phase "B", which is softer than the ultra-hard particles and/or ultra-hard phase, but which does not impair the function of the catalyst to bond the ultra-hard particles. Component "A" particles may be of any size that allows for the reaction phase to be well-dispersed and distributed in and throughout the abrasive compact after sintering. For example, component "A" particles may be from about 0.1 μm to about 50 μm particle diameter. Average particle sizes of component "A" particles may be significantly less than the sizes of the ultra-hard particles to promote fine dispersion during blending. The ultra-hard particles may be of particle sizes, for example varying between 0.1 μm to 100 μm.

The component "A" reactant particles may be added to the ultra-hard particles and sinter catalyst in the amount of about 0.5 w/w % to about 20 w/w % of the compact. The sinter catalyst may be present in the compact in an amount of about 10% to about 30% by weight, or about 15% to about 25% by weight, or about 18% to about 20% by weight of the compact. In some embodiments, the reactant particles may comprise about 2% to about 10% by weight of the compact. In other embodiments, the reactant particles may comprise about 3% to about 9% of the compact. The remaining weight of the compact may comprise ultra-hard particles. Component "A" reacts with the sinter catalyst and/or transforms in the presence or in contact with the sinter catalyst. The reaction or transformation may occur chemically or physically and includes, for example, melting. Upon reaction or transformation of component "A" particles with the sinter catalyst, a new phase "B" or reaction phase compound is formed. This new phase "B" preferably is well bonded to the ultra-hard particles and is not an ultra-hard phase. The new phase "B" may or may not itself be a catalyst for sintering. The new phase "B" has a lower hardness than that of the ultra-hard particles, and may be, for example, less than 3,000 KHN. Reaction phase "B" may be a carbide, boride or nitride compound of particle size and degree of crystallinity as may be accomplished by reaction during sintering. In various embodiments, reaction phase "B" may neither attract nor repel, nor consume entirely, sinter catalyst so as not to adversely affect the distribution, via infiltration, of sinter catalyst in the compacted ultra-hard particles.

In some embodiments, the selective addition of component "A" particles and its conversion to phase "B" in the sintered abrasive compacts may improve the grinding ratio by up to 150% or more of that of conventional compacts. Grinding ratio is a commonly used measure of machinability, observed during material fabrication during grinding or shaping in making sintered abrasive articles. Note the grinding ratio is a ratio of the volume of sintered abrasive compact removed per unit volume of grinding wheel removed, in a fixed grinding condition. Hardness, toughness, and strength in the formed compact remain in useful ranges for both production and application of the compact.

Referring to FIG. 1, the ultra-hard material 11, sinter catalyst 9 and component "A" 13 are blended (step 10) in ball mills or other appropriate equipment to form a fine dispersion. The blended components are dried (step 12) and loaded (step 14) into a refractory metal cup into which is also placed a substrate (step 14), such as a tungsten carbide/cobalt (WC/Co) disk. The cup may then be loaded into an HPHT pressure cell and compressed at a pressure between about 40 kbar to about 200 kbar, while being heated to about 1000° C. to about 2200° C. for about 5 minutes to about 300 minutes (step 16). The pressure cell preferably is cooled while pressure is released. The sintered article, now an abrasive compact 20, may then be removed and cleaned to reveal the ultra-hard abrasive compact. The abrasive compact includes the ultra-hard particles 22 with the reaction product 24 dispersed therethrough and bonded thereto. Not all of the sinter catalyst necessarily reacts with the reactant, and some unreacted catalyst 26 may remain in the finished product. The final product may be used in boring, cutting, milling, grinding or any other material removal operations produced by grinding, electric (al) discharge machining (EDM), laser cutting or the like.

Methods for preparing the abrasive compacts described above are encompassed by embodiments of the invention. The method may further include precoating component "A" particles with at least one sinter catalyst, and combining the coated component "A" particles with ultra-hard phase particles and sinter catalyst particles. The combined coated "A" particles, ultra-hard phase particles, and sinter catalyst may then be sintered by heating at high temperature, such as, for example, about 1000° C. to about 2200° C., under high pressure such as, for example, about 40 kbar to about 200 kbar for about 5 minutes to about 300 minutes, for example, to form an abrasive compact. The abrasive compact may then be shaped by grinding or EDM or laser or any method known in the art.

The method may also include the use of an external source of sinter catalyst in which the component "A" particles and ultrahard particles are blended in ball mills to form a fine dispersion. The blended components may be dried and loaded into a refractory metal cup into which is also placed a WC/Co disk. During sintering, at high temperature, such as, for example, about 1000° C. to about 2200° C., under high pressure such as, for example, about 40 kbar to about 200 kbar, for about 5 minutes to about 300 minutes, for example. A portion of the cobalt from the WC/Co disk may be extruded from the disk into the blended powder acting as a sinter catalyst and reacting with the "A" particles to form an abrasive compact. The abrasive compact may than be shaped by grinding or EDM or laser or any method know in the art.

EXAMPLES

Example 1

Comparative

A polycrystalline cubic boron nitride abrasive compact was prepared by blending 5 weight-percent powdered 2 µm aluminum powder with cBN powder of 2 µm to 4 µm particle size, in a fluid ball mill. The blended powders were placed into Ta metal cups to form a 2 mm thick compacted layer and sealed with a solid carbide disk at one end of the cup. These materials were sintered at 1450° C. and 55 kbar for 17 minutes in a standard HPHT pressure cell. The CBN compact was defect-free and subsequently EDM cut into small rectangles. A diamond wheel grinding test was used to evaluate ease of machining This diamond wheel removed 0.31 and 0.38 grams of the compact during a total 0.02 inch of grinding wheel downfeed.

Example 2

Invention

A PCBN abrasive compact was prepared as described in Example 1, with the exception that an additional component, 1 weight percent of hexagonal boron nitride, was added to the aluminum and cubic boron nitride mixture. The hexagonal boron nitride is 8 µm to 12 µm particle size. These powders were encapsulated as in Example 1 and subjected to high pressure sintering in the same run as Example 1. This compact was surprisingly defect free. The identical grinding test as in Example 1 above showed compact removal of 0.51 and 0.54 grams during a total 0.02 inch of grinding wheel downfeed. The grinding ratio of the boron nitride compact was increased by almost 50% by this addition.

Example 3

Comparative

A diamond abrasive compact was prepared by blending in a fluid ball mill, diamond powder of size 2 µm to 3 µm, with 10% 1 µm cobalt metal powder. The blended powder was loaded in a Ta metal cup and sealed with a solid carbide disk on one side and HPHT sintered at 1450° C. and 55 kbar for 25 minutes. The sintered part was ground and cut into 2 mm×10 mm parts for microscopic evaluation, for example, for thermal stability, and also for grinding tests. The diamond abrasive compact was visually and microscopically defect-free both before and after thermal cycling with an induction coil in air to 850° C. for 2 minutes and then cooled rapidly. There were no visible cracks, pits or delamination due to the thermal strain imposed. The compact, both before and after thermal cycling was visually and microscopically defect free.

Example 4

Invention

A compact was prepared as described in Example 3, with the exception that hexagonal boron nitride (hBN) was added at 1 and 3 weight percent levels to produce two compacts. Sintering, preparation, and testing conditions were identical to Example 3. Both compacts with the hBN addition of 1 and 3 weight percent visually and microscopically defect free before and after thermal cycling. The hexagonal boron nitride reacted completely to form $W_2Co_{21}B_6$, a cobalt/boron/tungsten compound. Both materials exhibited a surprising increase in grinding ratio. The 3% hBN addition compact was also brazed to a WC substrate as is common in the use of such compacts.

Example 5

Invention

A diamond abrasive compact was prepared as described in Example 4 with a 1% hBN addition as the reactant particles. The grinding ratio for the 1% hBN addition compact was similar to the results of Example 4 and substantially exceeding the resulting grinding ratio of Comparative Example 3.

Example 6

Invention

A diamond abrasive compact was prepared as described in Example 4 with a series of hBN additions as reactant particles to diamond powders of size 5 µm to 8 µm and 2 µm to 3 µm. The 5 µm to 8 µm diamond material, although intrinsically harder than 2 to 3 µm diamond, was softened substantially by hBN without being rendered defective.

Example 7

Invention

A diamond abrasive compact was prepared as described in Example 4 with 6 percent by weight of a hBN powder of particle size 2 µm to 4 µm as the reactant particles to diamond powder of 5 µm to 8 µm, the hBN being a different grain size as comparative Example 6 but identical weight-percent.

Example 8

Invention

A diamond abrasive compact was prepared as described in Example 4, comprising 3% w/w hBN of particle size 8 µm to 12 µm and diamond powder of size 2 µm to 3 µm, except the method was perturbed to impair dispersion of the hBN particles creating spots of locally high hBN-content. This PCD is defective in that those spots generate pits and cracks in the PCD material. The abrasion resistance of defective PCD material was compared to non-defective material, of equivalent composition and grain sizes (hBN and diamond). The defective PCD is considerably softer than the good material. This confirms that defects can render PCD soft.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A method of producing an abrasive compact comprising:
blending ultra-hard particles having a Knoop hardness of 5000 KHN or greater, a sinter catalyst, and reactant particles selected from the group consisting of hexagonal boron nitride, graphite, molybdenum sulfide, tungsten sulfide, a phosphide, or combinations thereof and having a Knoop hardness lower than that of the ultra-hard particles to form a mixture; and sintering the mixture so that the reactant particles react with the sinter catalyst to form a reaction phase to yield a sintered compact, wherein the reaction phase has a Knoop hardness lower than that of cubic boron nitride.

2. The method of claim 1, wherein the sintering comprises applying to the mixture a temperature from about 1000° C. to about 2200° C., and a pressure of about 40 kbar to about 200 kbar, for a sintering time of about 5 minutes to about 300 minutes.

3. The method of claim 1, further comprising pre-coating the reactant particles with the sinter catalyst prior to the blending.

4. The method of claim 1, further comprising shaping the sintered compact.

5. The method of claim 1, wherein the sinter catalyst comprises one or more of Fe, Co, W, Mn, Ni, or a compound thereof.

6. The method of claim 1, wherein, the reaction phase comprises about 0.5 to 20 weight-percent of the abrasive compact.

7. A method of producing an abrasive compact comprising:
sintering ultra-hard particles, a sinter catalyst, and reactant particles so that the reactant particles react with the sinter catalyst to form a reaction phase where the reactant particles are selected from the group consisting of hexagonal boron nitride, graphite, molybdenum sulfide, tungsten sulfide, a phosphide, or combinations thereof and the reaction phase has a Knoop hardness lower than that of cubic boron nitride; and
bonding the reaction phase to the ultra-hard particles to yield a sintered compact.

8. The method of claim 7 further comprising blending ultra-hard particles, a sinter catalyst, and reactant particles into a mixture.

9. The method of claim 7 wherein the reaction phase comprises boron containing product.

10. The method of claim 9, wherein the boron containing product further comprises tungsten and cobalt.

11. The method of claim 9, wherein the boron containing product is $Co_6W_6B_6$.

12. The method of claim 9, wherein the boron containing product is $W_2Co_{21}B_6$.

13. The method of claim 7, wherein the reactant is pre-coated with the sinter catalyst.

14. A method of making an abrasive compact, comprising:
blending ultra-hard particles having a Knoop hardness of 5000 KHN or greater, a sinter catalyst, and reactant particles selected from the group consisting of hexagonal boron nitride, graphite, a metallic sulfide, an intermetallic sulfide, a metal phosphide, an intermetallic phosphide, or combinations thereof to form a mixture; and
sintering the mixture so that the reactant particles form a reaction phase to yield a sintered compact so that the reaction phase has a Knoop hardness lower than that of cubic boron nitride.

15. The method of claim 14, wherein the reactant particles react with the sinter catalyst to form a reaction phase.

16. The method of claim 14, wherein the sinter catalyst comprises one or more of Fe, Co, W, Mn, Ni, or a compound thereof.

17. The method of claim 14, further comprising pre-coating the reactant particles with the sinter catalyst prior to the blending.

* * * * *